(12) United States Patent
Lee et al.

(10) Patent No.: US 10,871,291 B2
(45) Date of Patent: Dec. 22, 2020

(54) COOKING APPLIANCE

(71) Applicant: LG ELECTRONICS INC., Seoul (KR)

(72) Inventors: Suyong Lee, Seoul (KR); Jaekyung Yang, Seoul (KR); Haksoon Yang, Seoul (KR); Soochan Lee, Seoul (KR); Yongsoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 105 days.

(21) Appl. No.: 16/292,865

(22) Filed: Mar. 5, 2019

(65) Prior Publication Data

US 2019/0316783 A1    Oct. 17, 2019

(30) Foreign Application Priority Data

Apr. 12, 2018  (KR) .......................... 10-2018-0042651

(51) Int. Cl.
 *F24C 15/20*  (2006.01)
 *A47J 27/04*  (2006.01)
 *A47J 36/38*  (2006.01)

(52) U.S. Cl.
 CPC ........... *F24C 15/2007* (2013.01); *A47J 27/04* (2013.01); *A47J 36/38* (2013.01); *A47J 2027/043* (2013.01)

(58) Field of Classification Search
 CPC ..... F24C 15/2007; F24C 15/327; A47J 27/04; A47J 2027/043; A47J 36/38
 See application file for complete search history.

(56) References Cited

U.S. PATENT DOCUMENTS

2012/0199015 A1*   8/2012   Seguchi .................. A21B 3/04
                                                        99/403
2019/0307281 A1*  10/2019   Jung ....................... F24C 7/087

FOREIGN PATENT DOCUMENTS

| EP | 2369227 | | 9/2011 | |
|---|---|---|---|---|
| EP | 3225139 | A1 * | 10/2017 | ............. A47J 27/04 |
| GB | 2377483 | | 1/2003 | |
| JP | 2010121803 | | 6/2010 | |
| KR | 1020100111201 | | 10/2010 | |
| KR | 10-2011-0109661 | A | 10/2011 | |
| KR | 1020110109661 | | 10/2011 | |
| KR | 1020140008782 | | 1/2014 | |

OTHER PUBLICATIONS

Extended European Search Report in European Application No. 18203028.8, dated Apr. 11, 2019, 9 pages.

* cited by examiner

Primary Examiner — David J Laux
(74) Attorney, Agent, or Firm — Fish & Richardson P.C.

(57) ABSTRACT

A cooking appliance includes a main body that defines a cooking chamber configured to receive one or more objects, a steam generator configured to generate steam to heat the one or more objects in the cooking chamber by steam, a water tank configured to store water and to supply water to the steam generator, a water supply pipe configured to cause supply of water from the water tank to the steam generator, a steam supply pipe configured to supply steam generated by the steam generator to the cooking chamber, and a return pipe that is connected to the steam supply pipe and to the steam generator. The return pipe is configured to allow water discharged to the steam supply pipe to return to the steam generator.

17 Claims, 6 Drawing Sheets

COOKING APPLIANCE

CROSS-REFERENCE TO RELATED APPLICATION

This application is based on and claims the benefit of priority to Korean Patent Application No. 10-2018-0042651, filed on Apr. 12, 2018, in the Korean Intellectual Property Office, the disclosure of which is incorporated herein in its entirety by reference.

FIELD

The present disclosure relates to a cooking appliance.

BACKGROUND

The cooking appliance is an appliance that can cook food using heat of a heating source. The cooking appliance may include a heating source for heating food contained in a cooking chamber.

In some examples, the cooking appliance may include a plurality of heating sources. The plurality of heating sources may include an electric heater, a magnetron, a steam generator, etc.

In some cases, the cooking appliance includes a stream generator.

For example, the steam generator may include a heating space for receiving water for steam generation, a water supply port for supplying the water for steam generation to the heating space, a steam heater for heating the water for steam generation stored in the heating space to generate steam, a steam discharge port for discharging the steam heated by the steam heater, and a drain port for discharging the water for steam generation stored in the heating space to the outside of the heating space such that the water for steam generation supplied to the heating space through the water supply port is maintained at a predetermined water level.

In some cases, when the water for steam generation exceeds the predetermined water level, the water for steam generation may be discharged to the outside through the drain port, thereby preventing the water for steam generation from overflowing to the inside of the cooking chamber while the water for steam generation is heated.

In some cases where a high-output heater is used and the volume of the chamber that stores water for steam generation is small, water may vigorously boil. In some cases, when a bumping phenomenon occurs, the water for steam generation may not be discharged to the drain port and may be supplied to the cooking chamber together with steam.

In some cases when the water for steam generation is supplied to the cooking chamber, the cooking chamber may be contaminated by scales in the steam generator that may flow into the cooking chamber. In some cases when a large amount of water for steam generation is supplied to the cooking chamber, an enamel vessel may be broken due to thermal shock.

SUMMARY

The present disclosure provides a cooking appliance capable of preventing water discharged with steam from being supplied to a cooking chamber in a steam generation process.

The present disclosure provides a cooking appliance capable of returning water discharged to a steam supply pipe together with steam to a steam generator.

The present disclosure provides a cooking appliance capable of preventing water in a heating chamber from flowing back to a return pipe.

The present disclosure provides a cooking appliance capable of returning water of a steam supply pipe by a simple structure.

According to one aspect of the subject matter described in this application, a cooking appliance includes a main body that defines a cooking chamber configured to receive one or more objects, a steam generator configured to generate steam to heat the one or more objects in the cooking chamber by steam, a water tank configured to store water and to supply water to the steam generator, a water supply pipe configured to cause supply of water from the water tank to the steam generator, a steam supply pipe configured to supply steam generated by the steam generator to the cooking chamber, and a return pipe that is connected to the steam supply pipe and to the steam generator. The return pipe is configured to allow water discharged to the steam supply pipe to return to the steam generator.

Implementations according to this aspect may include one or more of the following features. For example, the steam generator may include: a heating chamber configured to receive water; a water supply part configured to supply water to the heating chamber; and a return part connected to the return pipe, where the return part is located vertically higher than a maximum water level of the heating chamber. In some examples, the return part is located vertically higher than the water supply part. In some examples, the steam generator further includes a partitioning part located vertically lower than the return part and higher than the water supply part.

In some implementations, the steam generator includes: a first body; and a second body configured to couple to the first body, the first body and the second body being configured to, based on coupling to each other, define the heating chamber, where the partitioning part protrudes from one of the first body or the second body, the partitioning part having an end that is spaced apart from the other of the first body or the second body. In some examples, the water supply part is located in the first body, the return part is located in the second body, and the partitioning part protrudes from the second body toward the first body, the end of the partitioning part being spaced apart from the first body.

In some implementations, the steam generator further includes a steam discharge part configured to discharge steam to the steam supply pipe, where the return part is located vertically lower than the steam discharge part. In some examples, the return part is located closer to the water supply part than to the steam discharge part. In some implementations, the steam supply pipe is bent one or more times, the steam supply pipe including a bent portion that is bent upward, the return pipe is connected to the bent portion of the steam supply pipe. In some examples, the steam supply pipe includes: a first supply pipe configured to receive steam discharged from the steam generator; and a second supply pipe that is bent from the first supply pipe and that extends upward, where the return pipe extends downward from a boundary between the first supply pipe and the second supply pipe.

In some implementations, an inner diameter of the return pipe is less than an inner diameter of the second supply pipe. For example, the inner diameter of the return pipe is in a range of ⅕ to ¼ of the inner diameter of the second supply pipe.

In some implementations, a cooking appliance further includes a water supply pump connected to the water supply pipe and configured to cause supply of water from the water tank to the steam generator, where the return pipe is configured to allow water to return to the steam generator based on operation of the water supply pump. In some examples, the return part is a passage defined at an inside of one of the first body of the steam generator or the second body of the steam generator.

In some implementations, the steam generator further includes a steam heater configured to heat water in the heating chamber, an upper portion of the steam heater is located vertically higher than the first body and the second body. In some examples, the partitioning part protrudes from the first body toward the second body, the end of the partitioning part being spaced apart from the second body. In some implementations, the steam generator further includes a partitioning part configured to divide the heating chamber into an upper chamber connected to the return part and a lower chamber connected to the water supply part.

In some implementations, at least a portion of the partitioning part defines a gap between an end of the partitioning part and an inner surface of the steam generator, the gap being configured to allow water to drop from the upper chamber to the lower chamber. In some examples, the first supply pipe extends downward from the boundary to the steam generator. In some examples, the boundary between the first supply pipe and the second supply pipe includes an inclined surface that extends to the return pipe and that is configured to guide water to the return pipe.

DETAILED DESCRIPTION

Hereinafter, some implementations of the present disclosure will be described in detail with reference to the accompanying drawings. It should be noted that when components in the drawings are designated by reference numerals, the same components have the same reference numerals as far as possible even though the components are illustrated in different drawings. Further, in description of implementations of the present disclosure, when it is determined that detailed descriptions of well-known configurations or functions disturb understanding of the implementations of the present disclosure, the detailed descriptions will be omitted.

Also, in the description of the implementations of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 1:
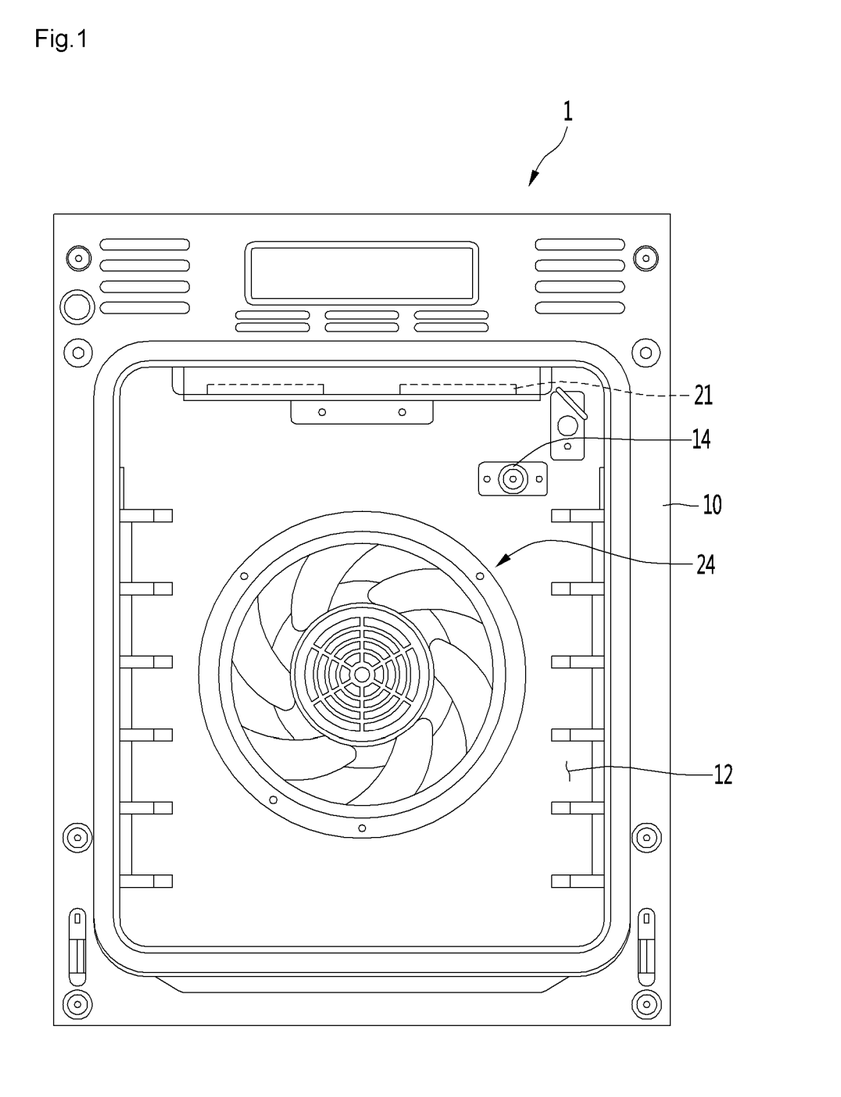
FIG. 1 is a view schematically showing an inside of an example cooking chamber of an example cooking appliance.
Figure 2:
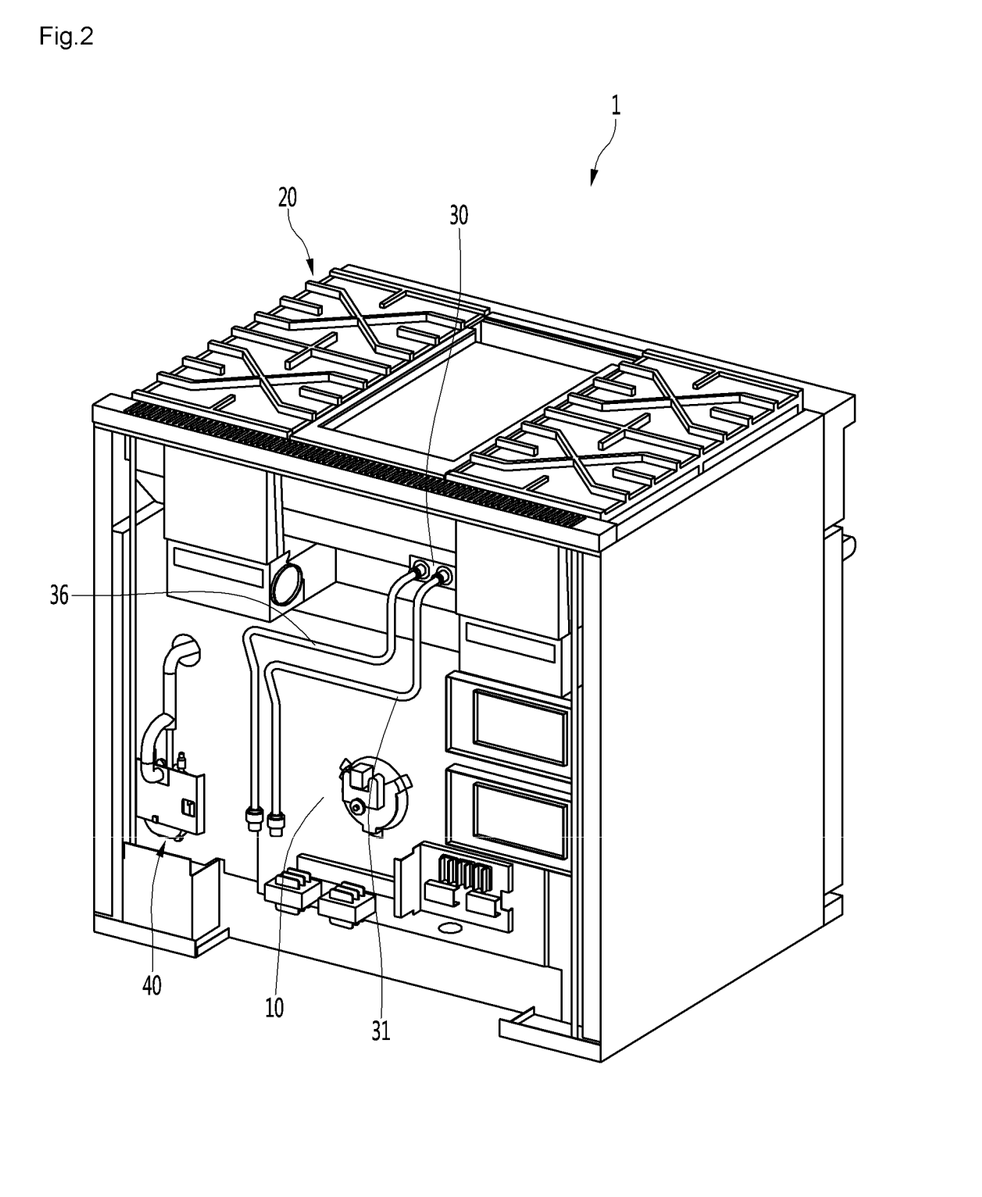
FIG. 2 is a view showing a state in which an example steam generator and an example water tank are installed in an example cooking appliance.
Figure 3:
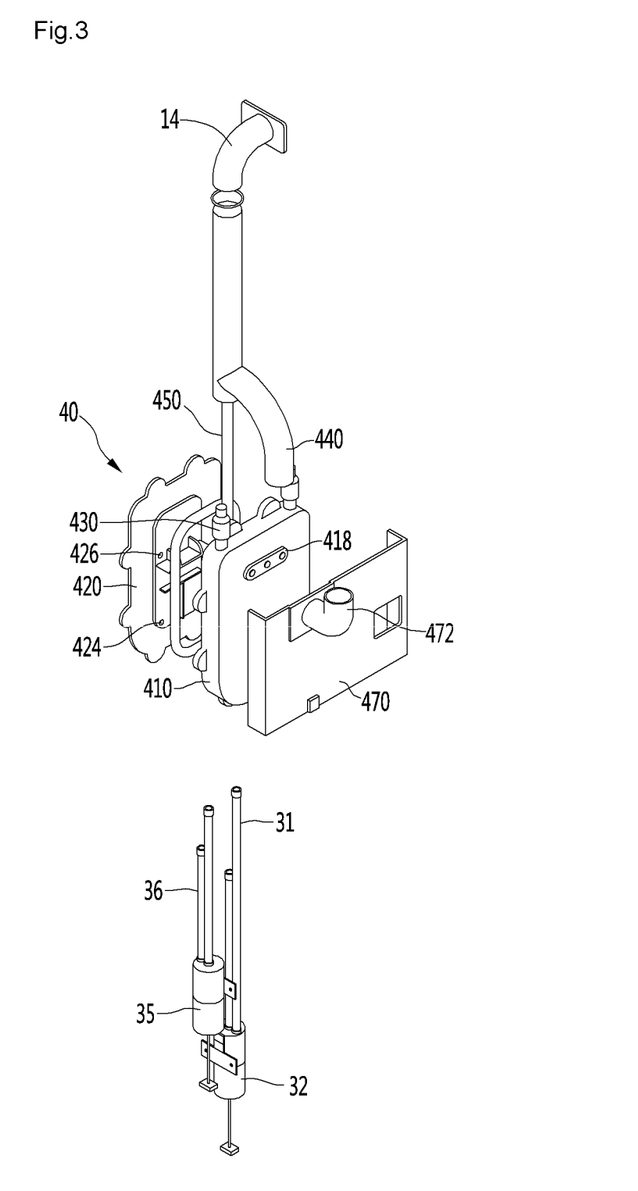
FIG. 3 is an exploded perspective view of an example steam generator.
Figure 4:
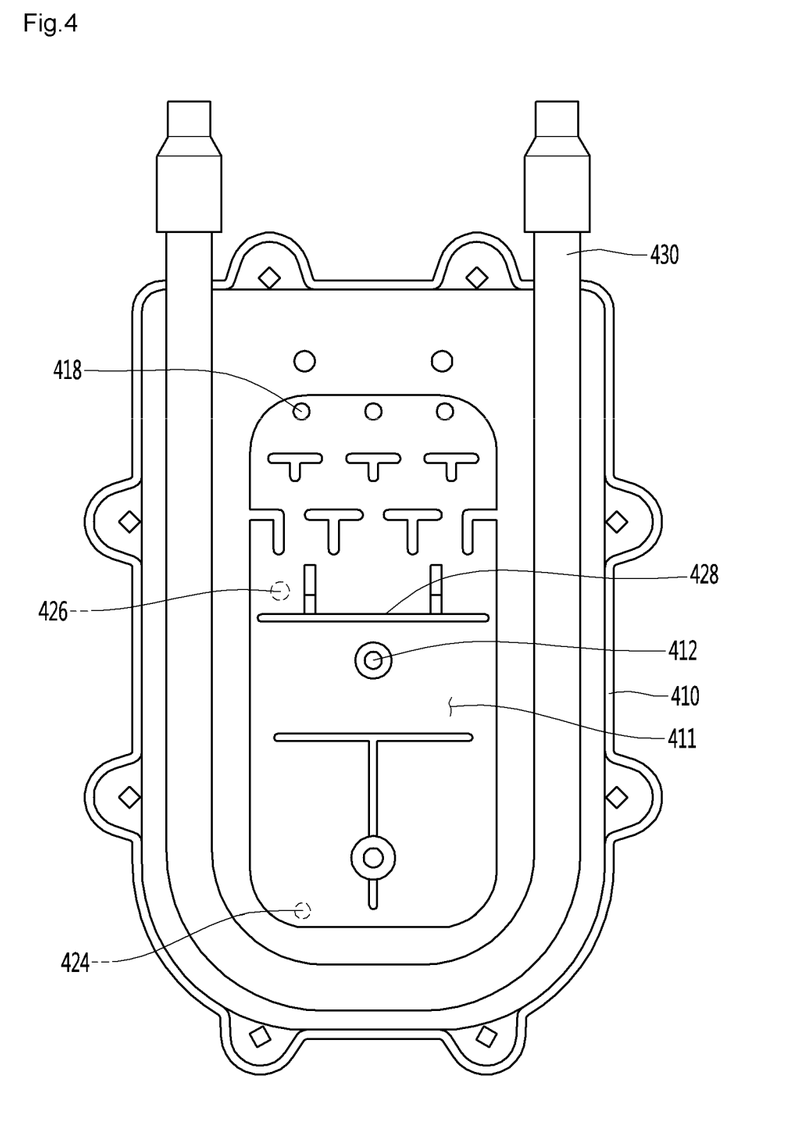
FIG. 4 is a view showing an example internal structure of an example steam generator.

FIG. 1 is a view schematically showing an inside of an example cooking chamber of an example cooking appliance, FIG. 2 is a view showing a state in which an example steam generator and an example water tank are installed in an example cooking appliance, FIG. 3 is an exploded perspective view of an example steam generator, and FIG. 4 is a view showing an example internal structure of an example steam generator.

Referring to FIGS. 1 to 4, the cooking appliance 1 according to the present implementation may include a main body 10. The main body 10 may include a cooking chamber 12. Although not shown, the cooking appliance 1 may further include a door connected to the main body 10 to open or close the cooking chamber 12.

The cooking appliance 1 may further include an upper cooking part 20 for heating food independently of food contained in the cooking chamber 12 according to the type of the cooking appliance 1.

The heating source of the upper cooking part 20 is not restrictive. FIG. 2 shows an upper cooking part including a burner, for example.

The cooking appliance 1 may include a plurality of heating sources in order to cook the food contained in the cooking chamber 12.

The plurality of heating sources may include different types of heating sources.

In some implementations, although not limited, the plurality of heating sources may include, for example, a heater 21.

The heater 21 may be, for example, located at an upper side in the cooking chamber 12 and may supply heat to the upper side of the cooking chamber 12. In some examples, the heater 21 may be located at the upper side of the cooking chamber 12 outside the cooking chamber 12. In this case, an opening, through which heat passes, may be formed in the upper wall of the cooking chamber 12. Alternatively, when the upper heater generates radiant energy, a transmission part may be provided in the upper wall of the cooking chamber 12.

Alternatively or in addition, an additional heater may be further provided at the lower side of the cooking chamber 12.

Alternatively or in addition, the plurality of heating sources may further include a convection heater (not shown) configuring a convection device 24. The convection device 24 may include a convection fan. By the convection fan, air in the cooking chamber 12 may flow to the convection heater, thereby being heated and then supplied to the cooking chamber 12.

The plurality of heating sources may further include a steam generator 40 for heating water to generate steam.

The cooking appliance 1 may further include a water tank 30 for supplying water to the steam generator 40. Although not limited, the water tank 30 may be disposed at a position higher than the steam generator 40 in the main body 10.

For example, the water tank 30 may be located above the cooking chamber 12.

The cooking appliance 1 may further include a water supply pipe 31 for supplying water of the water tank 30 to the steam generator 40, a water supply pump 32 connected to the water supply pipe 31, a drain pipe 36 for discharging water of the steam generator 40 and a drainage pump 35 connected to the drain pipe 36.

In some implementations, although not limited, the drain pipe 36 may be connected to the water tank 30. Accordingly, the water of the water tank 30 may be supplied to the steam generator 40, and the water of the steam generator 40 may be drained and returned to the water tank 30.

The steam generator 40 may include a first body 410 and a second body 420 coupled to the first body 410.

In a state in which the first body 410 and the second body 420 are coupled, the first body 410 and the second body 420 may form a heating chamber 411.

A steam heater 430 may be embedded in any one of the first body 410 or the second body 420.

In FIG. 3, for example, the steam heater 430 is installed in the first body 410.

Water supplied from the water tank 30 may be heated by heat generated by the steam heater 430 in the heating chamber 411.

A water supply part 412 for supplying water to the heating chamber 411 may be provided in any one of the first body 410 or the second body 420. The water supply part 412 may communicate with the water supply pipe 31.

In the present implementation, the water supply part 412 may be provided in the first body 410, for example.

A steam discharge part 418 for discharging steam generated by the heating chamber 411 may be provided in any one of the first body 410 or the second body 420.

In FIG. 3, the steam discharge part 418 is provided in the first body 410, for example.

A drain part 424 for discharging water of the heating chamber 411 may be provided in any one of the first body 410 or the second body 420.

In FIG. 3, for example, the drain part 424 is provided in the second body 420.

The water supply part 412 may be located at a position higher than the drain part 424 and located at a position lower than the steam discharge part 418.

For example, the water supply part 412 may be located at the center of the heating chamber 411, the steam discharge part 418 may be located at the upper side of the heating chamber 411, and the drain part 424 may be located at the lower side of the heating chamber 411.

A return part 426 for returning water to the heating chamber 411 may be provided in any one of the first body 410 or the second body 420.

Water discharged from the steam generator 40 together with steam may be returned to the return part 426.

In some implementations, although not limited, the return part 426 may be located in the second body 420.

According to the present implementation, the return part 426 may communicate with the heating chamber 411, and may be located at a position higher than the water supply part 412 in the heating chamber 411.

In some implementations, the return part 426 may be located at a position higher than the maximum water level of the heating chamber 411 in the heating chamber 411.

By this arrangement, it may be possible to prevent water from flowing back to the return part 426 while the water contained in the heating chamber 411 is heated.

Any one of the first body 410 or the second body 420 may further include a partitioning part 428 located in a region between the return part 426 and the water supply part 412.

The partitioning part 428 may be located at a position lower than the return part 426 and located at a position higher than the water supply part 412.

Accordingly, even if boiling occurs while the water contained in the heating chamber 411 is heated, it is possible to minimize flow of water to the return part 426 by the partitioning part 428.

The partitioning part 428 may protrude from one of the first body 410 or the second body 420 toward the other thereof, and may have an end thereof disposed to be spaced apart from the other of the first body or the second body.

In the present implementation, at least a portion of the partitioning part 428 may protrude from the second body 420, for example, in a horizontal direction and the end 428a (see FIG. 6) thereof may be spaced apart from the first body 410. A gap between the end 428a of the partitioning part 428 and the first body 410 may provide a passage, through which steam passes.

In the present implementation, since the return part 426 is provided in the second body 420, water returned through the return part 426 flows toward the first body 410.

When the partitioning part 428 extends from the second body 420, water returned through the return part 426 may flow toward the gap by the partitioning part 428 and drop downward from the gap.

The return part 426 may be located at a position lower than the steam discharge part 418. When the return part 426 is located at the position lower than the steam discharge part 418, it is possible to prevent the water returned by the return part 426 from being directly discharged to the steam discharge part 418.

In some implementations, although not limited, the return part 426 may be located closer to the water supply part 412 than the steam discharge part 418.

The steam generator 40 may further include a mounting bracket 470 for mounting the steam generator 40 to the main body 10. The mounting bracket 470 may be, for example, coupled to the first body 410.

The mounting bracket 470 may include a steam guide pipe 472 for guiding the steam discharged from the steam discharge part 418.

The cooking appliance 1 may further include a steam supply pipe 440 connected to the steam guide pipe 472 to supply the steam generated by the steam generator 40 to the cooking chamber 12.

The steam supply pipe 440 may be connected to a steam supply port 14. The steam supply port 14 is, for example, coupled to the main body 10 to finally supply steam to the cooking chamber 12.

That is, at least a portion of the steam supply port 14 may be exposed to the cooking chamber 12.

As another example, the steam supply pipe 440 may be directly connected to the main body 10 and the end of the steam supply pipe 440 may include the steam supply port 14.

The steam supply pipe 440 is bent once or more to guide the steam discharged from the steam discharge part 418 upward and to supply the steam to the cooking chamber 12.

In addition, a return pipe 450 for returning water between the steam and water discharged to the steam supply pipe 440 may be connected to the steam supply pipe 440.

The return pipe 450 may be connected to the return part 426.

Hereinafter, arrangement of the steam supply pipe 440 and the return pipe 450 will be described in detail.

Figure 5:
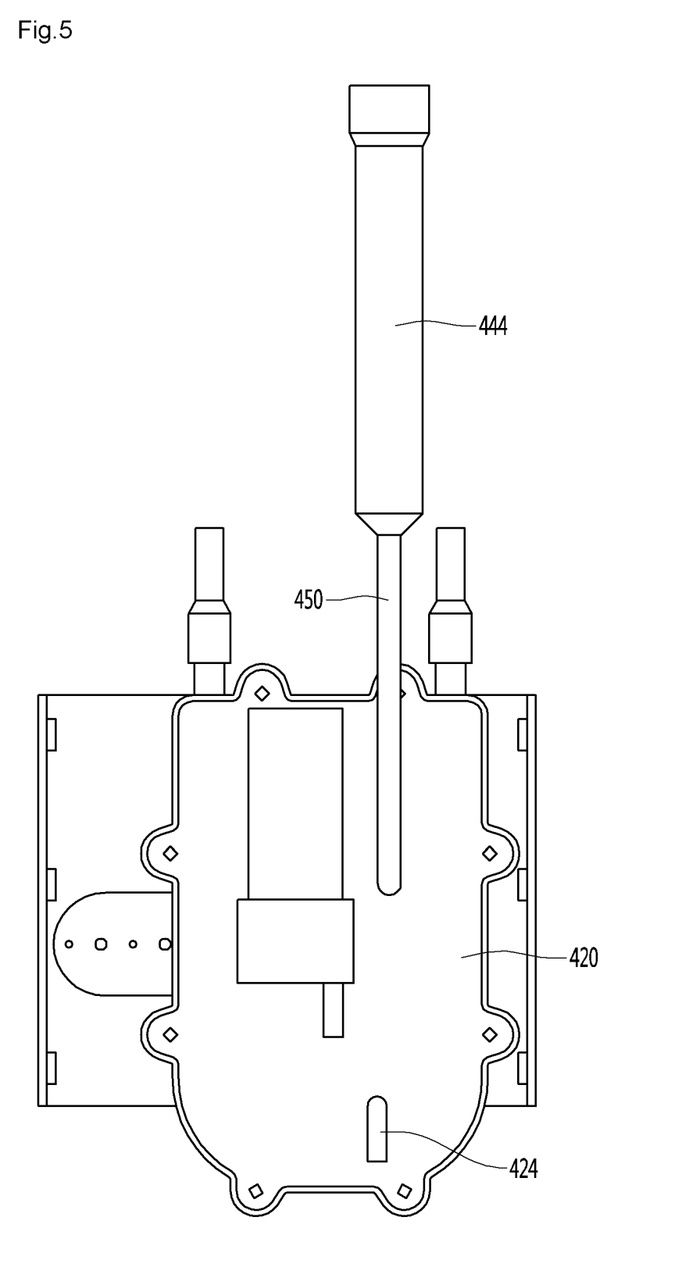
FIG. 5 is a view showing a state in which an example return pipe is connected to an example steam generator.
Figure 6:
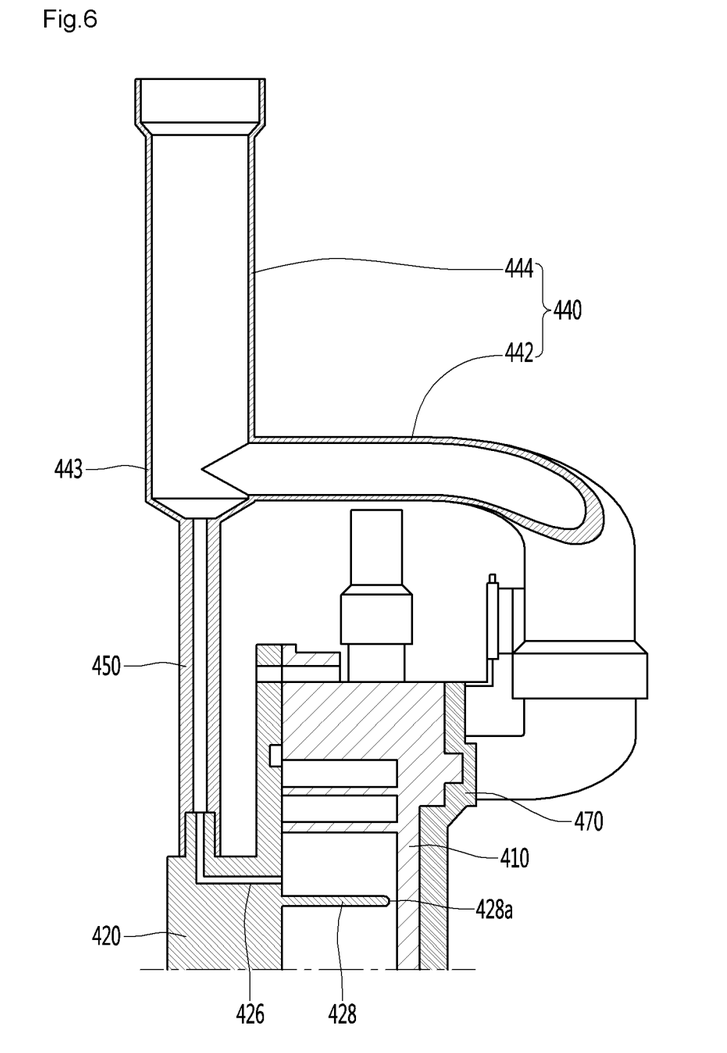
FIG. 6 is a cross-sectional view showing a state in which an example return pipe is connected to an example steam generator and an example steam supply.

FIG. 5 is a view showing a state in which an example return pipe is connected to an example steam generator, and FIG. 6 is a cross-sectional view showing a state in which an example return pipe is connected to an example steam generator and an example steam supply pipe.

Referring to FIGS. 3 to 6, the steam supply pipe 440 may include a first supply pipe 442 connected to the steam guide pipe 472 and a second supply pipe 444 bent from an end of the first supply pipe 442.

The second supply pipe 444 may be bent from the end of the first supply pipe 442 to extend upward.

Accordingly, the steam discharged to the first supply pipe 442 flows upward after the direction of the steam is changed at a boundary 443 between the first supply pipe 442 and the second supply pipe 444.

In some implementations, even when the water flows into the first supply pipe 442 together with steam, the steam and the water may be separated at the boundary 443 between the first supply pipe 442 and the second supply pipe 444 by a difference in specific gravity (or weight) between water and steam.

In order to efficiently return the water separated from the steam in the steam supply pipe 440, the return pipe 450 may be connected to the boundary 443 between the first supply pipe 442 and the second supply pipe 444 (an upwardly bent portion of the steam supply pipe 440).

In some implementations, the inner diameter of the return pipe 450 may be less than that of the second supply pipe 444.

In some examples, although not limited, the inner diameter of the return pipe 450 may be in a range of ⅕ to ¼ of the inner diameter of the second supply pipe 444, such that the water is returned to the return pipe 450 and the steam is prevented from flowing to the return pipe 450. In some implementations, the boundary 443 may include an inclined surface that extends to the return pipe 450 and that is configured to guide water to the return pipe 450.

If the inner diameter of the return pipe 450 is greater than ¼ of the inner diameter of the second supply pipe 444, the steam may flow to the return pipe 450.

In this case, the steam is returned to the heating chamber 411 along the return pipe 450 to reduce the amount of steam supplied to the cooking chamber 12, thereby increasing a cooking time. In some cases, when the steam flows to the return pipe 450, the amount of water returned to the return pipe 450 is reduced, thereby supplying water to the cooking chamber 12 through the second supply pipe 444.

In contrast, if the inner diameter of the return pipe 450 is less than ⅕ of the inner diameter of the second supply pipe 444, water may not be returned to the return pipe 450.

In the steam generation process, water may be returned to the return pipe 450. Since the pressure of the heating chamber 411 is similar to that of the steam supply pipe 440, the water of the return pipe 450 may not flow into the heating chamber 411 and may remain in the return pipe 450.

In some implementations, when steam is generated in the heating chamber 411, since the water level of the heating chamber 411 is reduced, the water supply pump 32 is repeatedly turned on and off, thereby periodically supplying water to the heating chamber 411.

In the present implementation, the inside of the heating chamber 411 has high pressure and a high temperature by operation of the steam heater 430.

Since the water supply pump 32 is periodically turned on and off, water is periodically supplied to the heating chamber 411.

Since the temperature of the water supplied to the heating chamber 411 is significantly lower than that of the water in the heating chamber 411, when water is supplied to the heating chamber 411, the internal pressure of the heating chamber 411 is temporarily decreased.

For example, when the water supply pump 32 operates to supply water to the heating chamber 411, the pressure of the heating chamber 411 becomes lower than that of the return pipe 450.

In this case, the water existing in the return pipe 450 may be returned to the heating chamber 411.

The return pipe 450 may be extended downward to be connected to the return part 426 of the steam generator 40, for example.

The present disclosure provides a simple structure that enables the water of the steam supply pipe 440 to return to the steam generator 40 through the return pipe 450 that extends downward from the bent portion of the steam supply pipe 440 and that is connected to the steam generator 40.

In some examples, even when the water flows to the steam supply pipe 440 together with steam in the steam generation process in the heating chamber 411, the water of the steam supply pipe 440 may be returned to the return pipe 450, thereby preventing water from being supplied to the cooking chamber 12.

In some examples, since the water of the return pipe 450 is returned to the heating chamber 411 due to a difference in pressure between the return pipe 450 and the heating chamber 411 at the time of operating the water supply pump 32, a separate algorithm for returning the water of the return pipe 450 to the heating chamber 411 is unnecessary.

In some examples, since the water discharged to the steam supply pipe 440 is returned to the heating chamber 411, it is possible to reduce the amount of water used in the steam generation process.

What is claimed is:

1. A cooking appliance comprising:
    a main body that defines a cooking chamber configured to receive one or more objects;
    a steam generator configured to generate steam to heat the one or more objects in the cooking chamber by steam, wherein the steam generator comprises: a heating chamber configured to receive water;
    a water tank configured to store water and to supply water to the steam generator;
    a water supply pipe configured to supply water from the water tank to the steam generator;
    a water supply part configured to supply water to the heating chamber;
    a steam supply pipe configured to supply steam generated by the steam generator to the cooking chamber;
    a return pipe that is connected to the steam supply pipe and to the steam generator, the return pipe being configured to allow water discharged to the steam supply pipe to return to the steam generator;
    a return part connected to the return pipe, wherein the return part is located vertically higher than a maximum water level of the heating chamber and vertically higher than the water supply part; and
    a partitioning part located vertically lower than the return part and higher than the water supply part.

2. The cooking appliance of claim 1, wherein the steam generator comprises:
    a first body; and
    a second body configured to couple to the first body, the first body and the second body being configured to, based on coupling to each other, define the heating chamber, and
    wherein the partitioning part protrudes from one of the first body or the second body, the partitioning part having an end that is spaced apart from the other of the first body or the second body.

3. The cooking appliance of claim 2, wherein the water supply part is located in the first body,
wherein the return part is located in the second body, and
wherein the partitioning part protrudes from the second body toward the first body, the end of the partitioning part being spaced apart from the first body.

4. The cooking appliance of claim 2, wherein the return part is a passage defined at an inside of one of the first body of the steam generator or the second body of the steam generator.

5. The cooking appliance of claim 2, wherein the steam generator further comprises a steam heater configured to heat water in the heating chamber, and
wherein an upper portion of the steam heater is located vertically higher than the first body and the second body.

6. The cooking appliance of claim 2, wherein the partitioning part protrudes from the first body toward the second body, the end of the partitioning part being spaced apart from the second body.

7. The cooking appliance of claim 1, wherein the steam generator further comprises a steam discharge part configured to discharge steam to the steam supply pipe, and
wherein the return part is located vertically lower than the steam discharge part.

8. The cooking appliance of claim 7, wherein the return part is located closer to the water supply part than to the steam discharge part.

9. The cooking appliance of claim 1, wherein the steam supply pipe is bent one or more times, the steam supply pipe including a bent portion that is bent upward, and
wherein the return pipe is connected to the bent portion of the steam supply pipe.

10. The cooking appliance of claim 9, wherein the steam supply pipe comprises:
a first supply pipe configured to receive steam discharged from the steam generator; and
a second supply pipe that is bent from the first supply pipe and that extends upward, and
wherein the return pipe extends downward from a boundary between the first supply pipe and the second supply pipe.

11. The cooking appliance of claim 10, wherein an inner diameter of the return pipe is less than an inner diameter of the second supply pipe.

12. The cooking appliance of claim 11, wherein the inner diameter of the return pipe is in a range of ⅕ to ¼ of the inner diameter of the second supply pipe.

13. The cooking appliance of claim 10, wherein the first supply pipe extends downward from the boundary to the steam generator.

14. The cooking appliance of claim 10, wherein the boundary between the first supply pipe and the second supply pipe includes an inclined surface that extends to the return pipe and that is configured to guide water to the return pipe.

15. The cooking appliance of claim 1, further comprising a water supply pump connected to the water supply pipe and configured to cause supply of water from the water tank to the steam generator,
wherein the return pipe is configured to allow water to return to the steam generator based on operation of the water supply pump.

16. The cooking appliance of claim 2, wherein the steam generator further comprises a partitioning part configured to divide the heating chamber into an upper chamber connected to the return part and a lower chamber connected to the water supply part.

17. The cooking appliance of claim 16, wherein at least a portion of the partitioning part defines a gap between an end of the partitioning part and an inner surface of the steam generator, the gap being configured to allow water to drop from the upper chamber to the lower chamber.

* * * * *